Patented Aug. 14, 1934

1,970,364

UNITED STATES PATENT OFFICE 1,970,364

PROCESS FOR PREPARING ORTHO-DIHYDROXY BENZENE

Frederick Baxter Downing, Carneys Point, N. J., and Richard Gesse Clarkson, Wilmington, Del., assignors to E. I. du Pont de Nemours & Company, Wilmington, Del., a corporation of Delaware No Drawing. Application January 17, 1933, Serial No. 652,242

6 Claims. (Cl. 260—154)

This invention relates to poly-hydroxy aromatic compounds, more particularly o-dihydroxy compounds of the benzene series, and a process for the manufacture thereof.

It has been found that o-dihydroxy compounds of the benzene series may be produced by the hydrolysis of o-dihalogen compounds of the benzene series. Various other methods have also been proposed for the production of o-dihydroxy compounds of the benzene series. In general, previously proposed processes have been characterized by operation on a batch scale. That is, the reactants are charged into an autoclave or other suitable reaction vessel, the reaction effected under the desired conditions, the reaction mixture discharged, and the o-dihydroxy benzene recovered therefrom. Each time a charge is removed from the autoclave it is cooled and when a new charge is introduced, the autoclave is reheated to the reaction temperature. In large scale operations, this cooling and reheating necessarily involves a relatively high added expense, not only as to the cost of fuel in supplying the heat, but also as to the factors of additional labor and manipulation and the lost time attending the cooling and heating of the reaction vessel. The output or capacity of a given reaction vessel and the cost of the product, therefore, are not all that might be desired.

It is an object of the present invention to provide a new and improved process for producing o-dihydroxy compounds of the benzene series. A further object is the provision of a continuous process for the manufacture of o-dihydroxy compounds of the benzene series. An additional object is the provision of a process for the production of o-dihydroxy compounds of the benzene series whereby the output of a given reaction vessel may be increased. Another object is the provision of a process for the manufacture of o-dihydroxy compounds of the benzene series which is practical and economical and effects considerable savings in heat over that required in batch scale operations. A further object is the provision of a new and improved process for the production of o-dihydroxy compounds of the benzene series in higher yields than in batch scale commercial operations, while attaining a relatively high output or capacity for a given reaction vessel. A still further and more specific object is the provision of a new and improved process for the manufacture of o-dihydroxy benzene from o-dichloro benzene. Other objects will appear hereinafter.

These objects are accomplished according to the present invention by a continuous process, involving continuously introducing an o-dihalogen benzene, water, hydroxyl ions, preferably in the form of a water-soluble alkaline hydroxide, and barium or strontium ions, preferably in the form of a water-soluble barium or strontium compound, into a reaction zone wherein is contained a suspension of an insoluble barium or strontium salt of the o-dihydroxy benzene, maintaining the reaction temperature and continuously withdrawing the insoluble salt of the o-dihydroxy benzene. The insoluble salt of the o-dihydroxy benzene may be treated in any suitable manner to recover the o-dihydroxy benzene. In carrying out the reaction, the reaction zone should preferably also contain a catalyst for the reaction. It is preferable, furthermore, that a means for removing oxygen from the reaction zone be provided initially, for example, by the addition of a suitable reducing agent.

While the invention is susceptible to considerable variation and modification in the manner of its practical application, particularly as regards the proportions of materials, temperatures, pressures and the exact method of procedure, the following examples, in which the parts are by weight, will serve to illustrate how the invention may be practiced.

Example I

A steel autoclave provided with a means of agitation was charged with 735 parts of o-dichloro benzene, 1225 parts of barium chloride, 800 parts of sodium hydroxide, 5 parts of cuprous oxide and 6800 parts of water and then heated to about 285° C. At this temperature the reaction was complete in about one hour. The autoclave was equipped with three valved inlets, entering above the reaction mixture, and a valved bottom outlet. During the reaction, the valves on the inlets and outlets were closed so that the reaction proceeded in liquid phase under an autogenous pressure of about 1000 to 1150 pounds per square inch. After one hour the valve on the bottom outlet was opened slightly, whereby a slow stream of the reaction product was allowed to pass through a cooling coil in which it was cooled to about 100° C. and the pressure was gradually reduced to atmospheric. It was then discharged into an open tub. From the open tub, the suspension of barium salt of o-dihydroxy benzene may be drawn off and worked up as desired to recover the o-dihydroxy benzene, e. g., by treatment with a dilute mineral acid, extracting the acidified product with a solvent and subjecting the extract to vacuum distillation.

At the same time the suspension of barium salt of o-dihydroxy benzene was withdrawn through the bottom outlet of the autoclave, there were pumped into the upper part of the reaction zone through the three valved inlets the following liquids:

(A) 147 parts of o-dichloro benzene
(B) 160 parts of sodium hydroxide dissolved in 300 parts of water
(C) 245 parts of barium chloride dissolved in 1060 parts of water These liquids were introduced into the reaction zone at a rate corresponding to the rate of withdrawal of the reaction product and in uniform proportions corresponding to their respective amounts.

Instead of pumping three liquids into the reaction zone severally through three inlets, a mixture of A and B may be pumped in through one inlet and C pumped in separately through another inlet, or alternatively a mixture of A and C may be pumped in through one inlet and B pumped in separately through another inlet. Such additions should be made with the temperature of the liquids at about 20° C. to 25° C. As a further variation A and B may be pumped into the reaction zone through one inlet and a mixture of B and C separately through another inlet, or a mixture of A, B and C may be introduced through one inlet; the temperatures of the liquids or liquid mixture in these cases preferably being above about 60° C. in order to prevent clogging of the inlet lines or pumps with solid barium hydroxide.

The suspended barium salt of o-dihydroxy benzene formed in the reaction mixture was thereafter removed continuously, and further quantities of the reactants continuously added. Small amounts of cuprous oxide were introduced from time to time in the form of a powder through a screw feed. If desired, the powdered cuprous oxide catalyst may be suspended in one of the liquids introduced into the reaction zone, or the catalyst may be introduced separately, e. g., as an aqueous solution of cuprous chloride or cuprous chloride dissolved in a small amount of concentrated hydrochloric acid.

Example II

Into a steel autoclave such as described in Example I, wherein was contained a suspended barium salt of o-dihydroxy benzene, there were continuously introduced 147 parts of o-dichloro benzene per hour, 631 parts of barium hydroxide-octahydrate per hour and 1070 parts of water per hour. The reaction zone also contained about 5.0 parts of a cuprous oxide catalyst, and this was replenished at the rate of about one part per hour. The barium salt of o-dihydroxy benzene present and formed in the reaction mixture was continuously removed at the rate of about 150 parts per hour. Along with the 150 parts of barium salt of o-dihydroxy benzene, it will be understood that water, barium chloride and other components of the reaction mixture were removed. The autoclave was maintained at a temperature of about 285° C., the pressure developed being about 1000 to 1150 pounds per square inch.

The mixture of water solution and suspended salt of o-dihydroxy benzene withdrawn from the reaction zone was made acid to Congo red paper with a solution of 20% hydrochloric acid, and the resultant liquid heated for a short time. The solution was then filtered to remove any undissolved solids and extracted with diethyl ether. The extract was evaporated to a small volume and o-dihydroxy benzene of about 98% purity was recovered.

Example III

An autoclave similar to that described in Example I was continuously charged with 73.5 parts of o-dichloro benzene per hour, 315 parts of barium hydroxide-octahydrate per hour, about 0.5 parts of cuprous oxide per hour and 1190 parts of water per hour (corresponding to a barium hydroxide concentration in the reaction zone of about 1.5 normal). The autoclave was maintained at a temperature of about 285° C. under autogenous pressure and o-dihydroxy benzene continuously recovered in relatively high yield in the form of its barium salt.

Example IV

Into an autoclave such as described in Example I, there were continuously introduced 147 parts of o-dichloro benzene per hour (about 93.5% purity), 245 parts of barium chloride ($BaCl_2.2H_2O$) per hour, 516 parts of 31% sodium hydroxide solution per hour, 990 parts of water per hour, and about 1.0 part of cuprous oxide per hour. The autoclave was maintained at a temperature of about 285° C., the pressure developed being about 1000 to 1150 pounds per square inch. The formed barium salt of o-dihydroxy benzene was continuously removed from the reaction zone in the form of a suspension at a rate proportional to the rate of introduction of the reactants. The o-dihydroxy benzene was recovered in any suitable manner, for instance, as described in Example II.

Example V

An autoclave similar to that described in Example I was continuously charged with about 544 parts of barium hydroxide-octahydrate per hour, 127 parts of o-dichloro benzene per hour, 1100 parts of water per hour (corresponding to an alkaline concentration of about 2.5 normal) and about 1.0 part of cuprous oxide catalyst. The autoclave was maintained at a temperature of about 300° C., and the suspended barium salt of o-dihydroxy benzene continuously removed from the reaction zone at a rate proportional to the introduction of the reactants. The o-dihydroxy benzene was recovered in a substantially pure state, as described in Example II.

Example VI

A steel autoclave provided with a means of agitation, for example, an autoclave such as described in Example I, was continuously charged with 147 parts of o-dichloro benzene per hour, 532 parts of strontium hydroxide-octahydrate per hour, and 1070 parts of water per hour. About 2 parts of cuprous oxide were added every two hours. The autoclave was maintained at a temperature of about 285° C. under autogenous pressure. The insoluble strontium salt of o-dihydroxy benzene was continuously removed from the reaction zone at a rate proportional to the rate of introduction of the reactants, and the o-dihydroxy benzene recovered by treatment with a mineral acid and extraction with a solvent.

Example VII

The procedure of Example I was followed except that the reaction product comprising the aqueous suspension of barium salt of o-dihydroxy benzene was removed from the reaction zone rapidly with high turbulence through a tubular cooling coil and discharged through a valve into a zone of reduced pressure at a temperature of about 150° C. Water and other vaporizable constituents of the reaction mixture, such as, for example, m-dichloro benzene, flashed into vapor. The zone of recovery was provided with an outlet at the top leading to a condenser for the recovery of the vaporized constituents. Under the conditions indicated, only a part of the water was flashed into steam, leaving the barium salt of o-dihydroxy benzene, together with some water and impurities. This mixture was removed from the zone of expansion through a bottom outlet and the o-dihydroxy benzene recovered by treatment with hydrochloric acid, then extracting the acidified product with diethyl ether and subjecting the extract to vacuum distillation. The barium chloride remaining in the acidified product after the extraction process was recovered and used again in the process. By this method of recovery, the purification of both the barium chloride and o-dihydroxy benzene was considerably simplified.

It will be understood that the invention is not limited by the foregoing examples. In carrying out the reaction described, good results have been obtained in the use of o-dichloro benzene of commercial grade, for example, having a purity of about 93.5%. Ortho-dichloro benzene of even lower purity may be used but is less desirable for the purposes of the invention. Higher yields may be obtained by the use of o-dichloro benzene substantially free from para-dichloro benzene which is the principal impurity. The yields obtained in a continuous process such as herein described are practically the same as those obtained for corresponding operations on a batch scale, but the capacity of the equipment (that is, the total output per hour or per day) is much greater.

While the invention has been particularly valuable in the manufacture of o-dihydroxy benzene from o-dichloro benzene, other o-dihalogen benzenes, such as o-dibromo benzene and o-di-iodo benzene, may be used. It will be recognized, however, that such raw materials are not equivalents of the chloro derivatives since, in general, it is easier to effect reactions of the type herein described with bromine and iodine derivatives than with chloro derivatives.

Substituted o-dichloro benzenes, o-dibromo benzenes and o-di-iodo benzenes which are stable under the conditions of reactions may also be converted to o-dihydroxy benzenes in accordance with the invention. As examples of compounds of this type may be mentioned o-dihalogen compounds having the general formula:

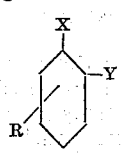

in which X and Y represent chlorine, bromine or iodine atoms, and R represents one or more substituent groups or atoms (not exceeding 4) such as, for example, alkyl ($-CH_3$, $-C_2H_5$, etc.), nitro ($NO_2$), hydroxyl, alkoxy ($OCH_3$, $-OC_2H_5$, etc.), and the like. Since, in some cases, substituent groups or atoms may activate the halogens in the X and Y positions so that the reaction proceeds more smoothly, it will be understood that the substituted o-dihalogen derivatives are not, in general, equivalents of the unsubstituted o-dihalogen derivatives.

As indicated by the examples, the hydroxyl ions and barium or strontium ions may be introduced into the reaction zone in the form of the barium or strontium hydroxides. Any other suitable means of introducing the hydroxyl ions and the barium or strontium ions into the reaction zone may be employed, as, for example, the addition of the barium or strontium ions in the form of a soluble barium or strontium salt and the addition of the hydroxyl ions in the form of an alkaline hydroxide which in combination with the barium or strontium salt will yield the alkaline earth hydroxide by double decomposition. As illustrative of compounds which may be used in accordance with the invention may be mentioned alkali metal hydroxides, such as potassium, sodium and lithium hydroxides, in combination with soluble barium and/or strontium salts such as, for example, the chlorides, bromides, iodides or acetates. The results obtained in effecting the reaction with barium chloride and sodium hydroxide have been especially desirable. The amounts of reactants introduced into the reaction zone in accordance with the invention may vary within relatively wide limits. In general, it is preferable to employ at least 1.5 equivalents and not more than about 4.0 equivalents of barium or strontium per mole of o-dihalogen benzene, and in excess of 2.0 equivalents and not more than 6.0 equivalents of hydroxyl per mole of o-dihalogen benzene. Very highly advantageous results have been obtained by carrying out the reaction with the introduction of about 2.0 equivalents of barium and about 4.0 equivalents of hydroxyl per mole of o-dihalogen benzene, preferably as one mole of barium chloride and 4.0 moles of sodium hydroxide per mole of o-dihalogen benzene.

In order to secure commercially practical results, the amount of water present in the reaction zone should preferably be such that the alkali concentration at no time is greater than about 3.6 normal. It will be understood that by alkali concentration is meant the concentration of hydroxyl as introduced in the form of a hydroxide. Apparently, the lower the alkali concentration, the higher the yields obtained. In operating on a batch scale, however, it is not usually practical to use alkali concentrations below about 2.9 normal, since increasing the amount of water decreases the capacity of a given reaction vessel. In continuous operation, however, on account of the fact that the capacity or total output of a given reaction vessel is greatly increased over that obtained in batch operations, desirable results may be obtained by the use of relatively lower alkali concentrations than has heretofore been practical. Generally speaking, it is preferable to maintain an alkali concentration in the reaction zone within the range of about 1.0 to about 3.0 normal.

In carrying out the reaction for the production of o-dihydroxy benzene from o-dichloro benzene, it has been observed that the presence of organic liquids such as alcohols, particularly ethyl and methyl alcohol, tend to cause the formation of o-chloro phenol and reduce the yield of o-dihydroxy benzene obtained from o-dichloro benzene. It is generally desirable, therefore, to avoid the presence of such compounds in the reaction mixture. Our best results have been obtained in the use of entirely aqueous hydrolyzing liquids.

While the process may be effected without a catalyst, the reaction is much slower, allowing more time for side reactions. It is preferable, therefore, to employ a catalyst and, for this purpose, any catalyst may be used which promotes the removal of halogens such as chlorine, bromine and iodine from organic compounds. The catalysts may be such as are effective in carrying out the Ullmann reaction, as illustrated by the following equations:

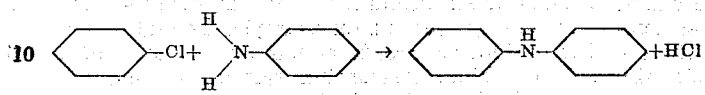

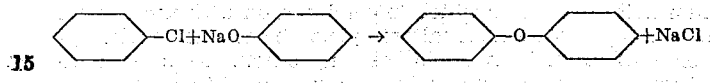

The proportions of catalyst may vary widely. Good results have been obtained in the use of about 0.5% to about 2.0% (based on the weight of o-dihalogen benzene) of catalyst, preferably cuprous oxide. If desired, larger or smaller proportions of catalyst may be used. As further examples of catalysts suitable for use in reactions involving removal of halogens from organic compounds may be mentioned silver, copper, iodides and iodates of alkali metals, salts and oxides of vanadium, tungsten, molybdenum, silver copper and rare earth metals. A continuous process is advantageous over a batch process in that the amount of catalyst required over a period of time is less.

The catalyst may be added to the reaction zone initially and in small amounts as required during the course of the reaction. As indicated in the examples, the addition may be made in any convenient manner, for example, as a salt or in the form of a solution.

The temperature of the reaction zone may vary within relatively wide limits but should preferably be above about 250° C. and below the decomposition temperature of the o-dihydroxy benzene under the conditions of the reaction. The temperatures may vary with the reactant and the catalyst employed but, in general, good results have been obtained in the use of temperatures of about 285° C. Lower temperatures tend to prolong the reaction time. In batch scale operations, good results may be obtained, however, in the use of temperatures of about 275° C., but in the production of o-dihydroxy benzene from o-dichloro benzene a given yield may be obtained in ten hours at 275° C. whereas the same yield may be obtained in one hour at 285° C. Higher temperatures may be used as, for example, 300° C. whereby the reaction is completed in a very short time. Apparently, the reaction proceeds very rapidly when the reactants are first brought into contact with each other, and the reaction time may be shortened considerably by making relatively small sacrifices in yields.

The pressure should preferably be such as to enable the reaction to proceed in liquid phase at the temperature employed. Good results have been obtained in effecting the reaction under the autogenous pressure of the reaction mixture at the temperature of reaction. If desired, other sources of pressure, as, for example, inert gas pressure or hydraulic pressure of the reactants, may be used.

The removal of free oxygen from the zone of reaction, while not essential, produces higher yields of the o-dihydroxy benzene. For this purpose, any suitable means of removing the oxygen may be employed, e. g., by displacing the air present in the reaction zone with nitrogen or other inert gas, by evacuating the vapor space, or by adding a reducing agent. Especially desirable results have been obtained in the use of a reducing agent such as sodium formate. As examples of other reducing agents may be mentioned sodium hydrosulfite, sodium formaldehyde sulfoxylate, potassium formate, and the like.

The quantity of reducing agent may vary but should preferably be sufficient to react with the oxygen of the air in the reaction zone. Good results have been obtained in the use of about one to about two ounces of sodium formate per cubic foot of air in the reaction vessel after the introduction of the reactants.

The reducing agent may be added to the reaction zone initially in any suitable manner, for example, as a solid salt or in the form of a solution.

The method of recovering the o-dihydroxy benzene may vary considerably, but the procedures described in the examples have given very satisfactory results. In acidifying the mixture of water solution and suspended salt of o-dihydroxy benzene, according to the procedures described, any suitable acid such as, for example, sulfuric or hydrochloric may be used. In extracting the acidified solution other solvents for the o-dihydroxy benzene besides diethyl ether, such as, for example, di-isopropyl ether and mixtures of ether and benzene, may be used. The procedure described in Example VII is especially desirable since it greatly facilitates the purification of the o-dihydroxy benzene and the recovery of the barium (or strontium) salt for use again in the process and yet requires little control because the desired product, viz., the insoluble salt of the o-dihydroxy benzene, is not vaporized but remains in the flashing vessel and may be easily recovered in solid form or as a suspension. The flashing zone or zone of expansion should be maintained at a pressure substantially below that of the introduced reaction mixture. It will be understood, however, that pressures above or below atmospheric may be used in this zone.

The character of the apparatus may vary widely and may be of any suitable type or design capable of withstanding the operating conditions. The reaction vessel may be constructed of materials such as copper, iron, mild steel, stainless steels and silver. The use of iron or mild steel for this purpose could not be foreseen, since it would be expected that these materials would inhibit the reaction.

The invention has the advantage that by its use compounds such as o-dihydroxy benzene may be produced continuously in larger quantities than may be obtained during the same period from a given reaction vessel in batch scale operations. Very little extra equipment is required over that necessary for batch scale operations and a number of economies are effected, e. g., savings in heat and labor. By carrying out the hydrolysis in the presence of more water than is commercially practical in batch scale operations, higher yields may be obtained while attaining a higher output or capacity for a given reaction vessel than is attainable in a batch process.

By the terms "continuous" and "continuously" as used throughout the specification and claims with reference to the introduction of the reactants into the reaction zone and the withdrawal of the reaction products, it is meant to include the addition or withdrawal of these materials at intervals, as in a semi-continuous process, as well as their introduction and/or withdrawal in uninterrupted streams.

As many apparently widely different embodiments of this invention may be made without departing from the spirit and scope thereof, it is to be understood that we do not limit ourselves to the specific embodiments thereof except as defined in the following claims.

We claim:

1. In a continuous process for producing o-dihydroxy compounds of the benzene series, the steps which comprises continuously introducing an o-dihalogen benzene, water, hydroxyl ions in the form of a water-soluble alkaline hydroxide, of metal ions selected from the group consisting of barium and strontium ions in the form of water-soluble barium and strontium compounds into a reaction zone wherein is contained a catalyst and a suspension of an insoluble barium or strontium salt of the o-dihydroxy benzene, maintaining the reaction zone under super-atmospheric pressure at a temperature above about 250° C. and below the decomposition temperature of the formed salt of the o-dihydroxy benzene, and continuously withdrawing a portion of the reaction mixture into a zone of lower pressure where the vaporizable components are immediately transformed into vapor and are separately removed from the insoluble salt of the o-dihydroxy benzene.

2. A process according to claim 1 in which the catalyst is introduced into the reaction zone during the course of the reaction.

3. In a continuous process for producing o-dihydroxy compounds of the benzene series, the steps which comprise hydrolyzing an o-dihalogen compound of the benzene series in a reaction zone containing ions of a metal forming an insoluble salt of the o-dihydroxy benzene, continuously introducing the o-dihalogen benzene, water, the said metal ions and hydroxyl ions into the reaction zone, maintaining reaction temperature and super-atmospheric pressure in the reaction zone, and continuously withdrawing a portion of the reaction mixture into a zone of lower pressure where the vaporizable components are immediately transformed into vapor and are separately removed from the insoluble salt of the o-dihydroxy benzene.

4. In a continuous process for producing o-dihydroxy compounds of the benzene series, the steps which comprise continuously introducing an o-dihalogen benzene, water, hydroxyl ions in the form of a water-soluble alkaline hydroxide and metal ions selected from the group consisting of barium and strontium ions in the form of water-soluble barium and strontium compounds into a reaction zone wherein is contained a catalyst for the Ullmann reaction and a suspension of an insoluble barium or strontium salt of the o-dihydroxy benzene, regulating the rate of introduction of the reactants so that the reaction mixture contains about 1.5 to about four equivalents of barium or strontium per mol of o-dihalogen benzene and in excess of two equivalents and not more than about six equivalents of hydroxyl per mol of o-dihalogen benzene and sufficient water to render the alkali concentration below about 2.9 normal, maintaining the reaction zone under super-atmospheric pressure at a temperature above about 250° C. and below the decomposition temperature of the formed salt of the o-dihydroxy benzene, and continuously withdrawing a portion of the reaction mixture into a zone of lower pressure where the vaporizable components are immediately transformed into vapor and are separately removed from the formed salt of the o-dihydroxy benzene.

5. In a continuous process for producing o-dihydroxy benzene, the steps which comprise continuously introducing o-dichloro benzene, water, an alkali metal hydroxide and a compound selected from the group consisting of water-soluble barium and strontium salts into a reaction zone wherein is contained a catalyst for the Ullmann reaction and a suspension of an insoluble barium or strontium salt of o-dihydroxy benzene, regulating the proportions of the reactants so that the reaction mixture contains about two to about four equivalents of barium or strontium per mol of o-dichloro benzene, about four equivalents of alkali metal hydroxide per mol of o-dichloro benzene, a small amount of catalyst and an amount of water corresponding to an alkali concentration within the range of about one to about three normal, maintaining the reaction zone under super-atmospheric pressure at a temperature above about 250° C. and below the decomposition temperature of the formed salt of o-dihydroxy benzene, and continuously withdrawing a portion of the reaction mixture into a zone of lower pressure where the vaporizable components are immediately transformed into vapor and are separately removed from the formed salt of o-dihydroxy benzene.

6. In a continuous process of producing o-dihydroxy benzene, the steps which comprises continuously introducing o-dichloro benzene, water, barium chloride, sodium hydroxide and cuprous oxide into a reaction zone in proportions corresponding to about one mol of o-dichloro benzene, about one mol of barium chloride, about four mols of sodium hydroxide, about 0.05% to 2.0% cuprous oxide (based on the weight of o-dichloro benzene) and sufficient water to maintain the alkali concentration about 2.9 normal, maintaining the temperature of the reaction zone at about 285° C. under autogenous pressure, and continuously withdrawing a portion of the reaction mixture into a zone of lower pressure where the vaporizable components are immediately transformed into vapor and are separately removed from the formed insoluble barium salt of o-dihydroxy benzene.

FREDERICK BAXTER DOWNING.
RICHARD G. CLARKSON.

CERTIFICATE OF CORRECTION.

Patent No. 1,970,364. August 14, 1934.

FREDERICK BAXTER DOWNING, ET AL.

It is hereby certified that error appears in the printed specification of the above numbered patent requiring correction as follows: Page 5, line 21, claim 1, for "of" second occurrence read and; and that the said Letters Patent should be read with this correction therein that the same may conform to the record of the case in the Patent Office.

Signed and sealed this 25th day of September, A. D. 1934.

Leslie Frazer (Seal)　　　　　　　　　　　　　　　　　　　Acting Commissioner of Patents.